United States Patent
Amano (10) Patent No.: US 10,000,631 B2
(45) Date of Patent: Jun. 19, 2018

(54) POLYPROPYLENE-BASED RESIN SHEET AND FORMED OBJECT

(71) Applicant: Kaneka Corporation, Osaka (JP)

(72) Inventor: Masaki Amano, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days. days.

(21) Appl. No.: 15/292,876

(22) Filed: Oct. 13, 2016

(65) Prior Publication Data

US 2017/0029611 A1 Feb. 2, 2017

Related U.S. Application Data

(63) Continuation of application No. PCT/JP2015/061405, filed on Apr. 14, 2015.

(30) Foreign Application Priority Data

Apr. 17, 2014 (JP) ................. 2014-085772

(51) Int. Cl.
- *C08L 23/12* (2006.01)
- *C08L 51/06* (2006.01)
- *C08J 5/18* (2006.01)
- *C08F 255/02* (2006.01)

(52) U.S. Cl.
CPC ............ *C08L 23/12* (2013.01); *C08F 255/02* (2013.01); *C08J 5/18* (2013.01); *C08L 51/06* (2013.01); *C08J 2323/12* (2013.01); *C08J 2423/26* (2013.01); *C08L 2203/30* (2013.01); *C08L 2205/02* (2013.01)

(58) Field of Classification Search
CPC ...... C08L 51/06; C08L 23/12; C08L 2203/30; C08L 2205/02; C08J 5/18; C08J 2323/12; C08J 2423/26; C08F 255/02; C08F 236/08

See application file for complete search history.

(56) References Cited

U.S. PATENT DOCUMENTS

| | | | | |
|---|---|---|---|---|
| 5,670,595 | A * | 9/1997 | Meka et al. | C08F 210/06 522/150 |
| 6,433,109 | B1 * | 8/2002 | Raetzsch et al. | C08F 255/02 526/335 |
| 2008/0302843 | A1 * | 12/2008 | Mogami | B60R 5/04 224/539 |

FOREIGN PATENT DOCUMENTS

| | | |
|---|---|---|
| JP | H05262897 A | 10/1993 |
| JP | H09188729 A | 7/1997 |
| JP | H11116724 A | 4/1999 |
| JP | H11172016 A | 6/1999 |
| JP | 2002003668 A | 1/2002 |
| JP | 2003048996 A | 2/2003 |
| JP | 2003327732 A | 11/2003 |
| JP | 2007308622 A | 11/2007 |
| JP | 2010241978 A | 10/2010 |

OTHER PUBLICATIONS

International Search Report issued in International Application No. PCT/JP2015/061405 dated May 19, 2015 (5 pages).
International Preliminary Report on Patentability issued in International Application No. PCT/JP2015/061405; dated Oct. 18, 2016 (5 pages).

* cited by examiner

*Primary Examiner* — Nathan M Nutter
(74) *Attorney, Agent, or Firm* — Osha Liang LLP (57) ABSTRACT

A polypropylene resin sheet which shows sufficiently reduced drawdown with excellent melt elongation and further has good heat resistance and good appearance. The polypropylene resin sheet may be formed from a polypropylene resin composition, the polypropylene resin composition containing: 60% to 97% by weight of a first polypropylene resin having a melt flow rate range of 0.1 to 10 g/10 min, and 3% to 40% by weight of a modified polypropylene resin having a elongational viscosity ratio to the first polypropylene resin of at least 1.5, at a strain of 3, obtained by melt kneading a second polypropylene resin, a conjugated diene compound, and a radical polymerization initiator.

4 Claims, 1 Drawing Sheet

POLYPROPYLENE-BASED RESIN SHEET AND FORMED OBJECT

TECHNICAL FIELD

The present invention relates to a polypropylene resin sheet and a formed article obtained by thermoforming the sheet.

BACKGROUND

Formed articles obtained by thermoforming resin sheets are widely used in various applications, such as food containers, automotive parts, building materials, and home appliance parts. In particular, formed articles containing polypropylene resins as base materials are suitable for applications requiring their high heat resistance, high chemical resistance or other properties.

However, unfortunately, polypropylene resin sheets greatly sag during preheating in thermoforming (this sagging phenomenon is hereinafter referred to as "drawdown"), thereby likely causing defects such as formation of wrinkles in formed products. For this reason, there are restrictions on forming conditions, such as that these sheets are unable to be sufficiently heated. Particularly, in order to meet the increasing demand for deep draw forming, the sheets have been required to show less drawdown than the prior art and excellent elongation during shaping.

In order to solve these problems, for example, Patent Literature 1 discloses a sheet formed from a composition containing a specific polypropylene together with a specific low-density polyethylene, a high-density polyethylene, and talc. However, in this method, a relatively large amount of the polyethylene resins are added to the polypropylene resin, which disadvantageously leads to impairment of the heat resistance of the polypropylene resin and deterioration of the appearance.

In addition, for example, Patent Literature 2 discloses a sheet formed from a composition containing a high molecular weight polyethylene with a specific intrinsic viscosity and a polypropylene resin having a specific melt tension. This method, however, does not provide a sufficient drawdown-reducing effect.

Furthermore, for example, Patent Literature 3 discloses a polypropylene resin for a sheet having a specific MFR and a specific melt tension, obtained by melt kneading a propylene polymer and a peroxydicarbonate. However, the resin obtained by this method also does not have a sufficient drawdown-reducing effect and does not show sufficient elongation during shaping. Therefore, unfortunately, the resulting sheet may break when it is stretched.

CITATION LIST

Patent Literature

Patent Literature 1: JP H05-262897 A
Patent Literature 2: JP 2002-3668 A
Patent Literature 3: JP 2003-48996 A

SUMMARY OF INVENTION

One or more embodiments of the present invention provide for a polypropylene resin sheet which shows sufficiently reduced drawdown with excellent melt elongation and further has good heat resistance and good appearance.

The present inventor has conducted various investigations to solve the above problem, and has found that the above problem can be solved using a sheet that contains a composition containing a polypropylene resin and a modified polypropylene resin. Thus, the present invention has been completed.

One or more embodiments of the present invention includes the following features.

[1] A polypropylene resin sheet, formed from a polypropylene resin composition, the polypropylene resin composition containing:
(A) 60% to 97% by weight of a polypropylene resin; and
(B) 3% to 40% by weight of a modified polypropylene resin, the modified polypropylene resin obtained by melt kneading (a) a polypropylene resin, (b) a conjugated diene compound, and (c) a radical polymerization initiator,
the polypropylene resin (A) having a MFR (230° C., 2.16 kg load) of 0.1 to 10 g/10 min,
the polypropylene resin (a) having a MFR (230° C., 2.16 kg load) of 1 to 10 g/10 min which is not lower than the MFR of the polypropylene resin (A),
the modified polypropylene resin (B) exhibiting strain hardening in elongational viscosity measurement (180° C., extension rate: 0.1/sec),
the elongational viscosity ratio of the modified polypropylene resin (B) to the polypropylene resin (A) at a strain of 3 being at least 1.5.

[2] The polypropylene resin sheet according to [1], wherein the modified polypropylene resin (B) has a MFR higher than the MFR of the polypropylene resin (A).

[3] The polypropylene resin sheet according to [1] or [2], wherein the conjugated diene compound (b) is isoprene.

[4] A formed article, obtained by thermoforming the polypropylene resin sheet according to any one of [1] to [3].

The polypropylene resin sheet containing a polypropylene resin and a modified polypropylene resin, according to one or more embodiments disclosed herein, has high drawdown resistance and can be sufficiently heated in thermoforming. Further, the polypropylene resin sheet shows excellent melt elongation and can be subjected to deep draw forming. In addition, the polypropylene resin sheet is easily thermoformed even when it has a large thickness and a high basis weight (weight per unit area). Furthermore, with the polypropylene resin sheet, it is possible to improve thermoformability while maintaining heat resistance, chemical resistance, and stiffness. The sheet also has excellent appearance.

DESCRIPTION OF EMBODIMENTS

<Polypropylene Resin Composition>

Figure 1:
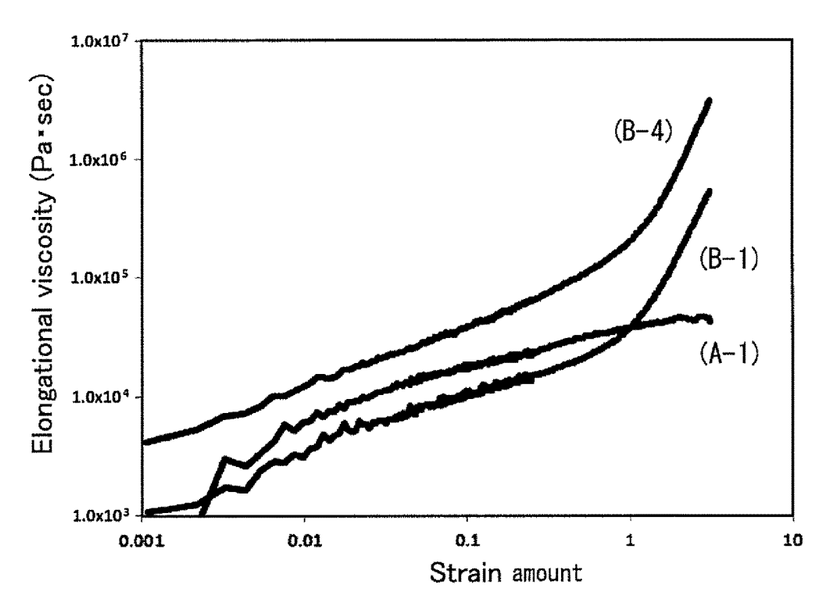
The FIGURE shows the elongational viscosity characteristics of the resins (A-1), (B-1), and (B-4) used in examples and comparative examples according to one or more embodiments of the present invention.

The polypropylene resin sheet may be formed from a polypropylene resin composition containing 60% to 97% by weight of a polypropylene resin (A), and 3% to 40% by weight of a modified polypropylene resin (B). The ratio between the polypropylene resin (A) and the modified polypropylene resin (B) may be 70% to 95% by weight of (A) and 5 to 30% by weight of (B), such as 75% to 90% by weight of (A) and 10% to 25% by weight of (B). If the proportion of the polypropylene resin (A) blended is less than 60% by weight, the melt elongation characteristic tends to be insufficient. Also, if the proportion of the polypropylene resin (A) blended is more than 97% by weight, the sheet tends to show excessive drawdown.

<Polypropylene Resin (A)>

The polypropylene resin (A) has a MFR (230° C., 2.16 kg) of 0.1 to 10 g/10 min, such as 0.3 to 8 g/10 min, or such as 0.5 to 4 g/10 min. If the MFR is lower than 0.1 g/10 min, the fluidity of the melt tends to be insufficient, and the appearance of the resulting resin sheet tends to deteriorate. In addition, shapability tends to deteriorate in thermoforming. Also, if the MFR is higher than 10 g/10 min, the resulting resin sheet tends to show excessive drawdown even though the modified polypropylene resin (B) is added. The MFR can be measured according to Method A set forth in JIS K 7210 (1999).

The polypropylene resin (A) is a major component of the resin sheet, and is selected in view of ease of forming into a resin sheet and formability of the resin sheet in thermoforming. Examples of the polypropylene resin (A) include a propylene homopolymer, block copolymers of propylene and another monomer, random copolymers of propylene and another monomer, and other polymers. These polymers may be crystalline. Among these polymers, a propylene homopolymer may exhibit high stiffness and low cost. Also, block copolymers of propylene and another monomer may exhibit both high stiffness and high impact resistance. Also, random copolymers of propylene and another monomer may exhibit high transparency. Furthermore, in order to control these properties, the propylene homopolymer, block copolymers, and random copolymers may be mixed.

When the polypropylene resin (A) is a block copolymer of propylene and another monomer or a random copolymer of propylene and another monomer, the propylene monomer content may be not less than 75% by weight of the total weight, such as not less than 90% by weight of the total weight, in order to maintain the characteristically high heat resistance, chemical resistance, and stiffness of polypropylene resins.

The other monomer may be one or two or more selected from the group consisting of ethylene, α-olefins, cyclic olefins, diene monomers, and vinyl monomers. Some examples include C2 or C4-C12 α-olefins such as ethylene, 1-butene, isobutene, 1-pentene, 3-methyl-1-butene, 1-hexene, 4-methyl-1-pentene, 3,4-dimethyl-1-butene, 1-heptene, 3-methyl-1-hexene, 1-octene, and 1-decene; cyclic olefins such as cyclopentene, norbornene, and tetracyclo[6,2,11,8,13,6]-4-dodecene; diene monomers such as 5-methylene-2-norbornene, 5-ethylidene-2-norbornene, 1,4-hexadiene, methyl-1,4-hexadiene, and 7-methyl-1,6-octadiene; and vinyl monomers such as vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, vinyltoluene, and divinylbenzene.

<Modified Polypropylene Resin (B)>

The modified polypropylene resin (B) used in one or more embodiments of the present invention is characterized in that it is obtained by melt kneading (a) a polypropylene resin, (b) a conjugated diene compound, and (c) a radical polymerization initiator; the polypropylene resin (a) has a MFR (230° C., 2.16 kg) of 1 to 10 g/10 min which is not lower than the MFR of the resin (A) as measured under the same conditions; and the modified polypropylene resin (B) exhibits strain hardening in elongational viscosity measurement (180° C., extension rate: 0.1/sec). Further, the elongational viscosity ratio of the modified polypropylene resin (B) to the polypropylene resin (A) at a strain of 3 is at least 1.5.

It is considered that a branch structure is introduced into the modified polypropylene resin (B) during the melt kneading of the polypropylene resin (a), the conjugated diene compound (b), and the radical polymerization initiator (c). It has been previously known that in order to reduce drawdown of polypropylene resin sheets, it is effective to modify the polypropylene resins generally having a linear molecular structure to introduce a branch structure.

The polypropylene resin (a) may be the same as that used as the polypropylene resin (A) as long as the above conditions are satisfied. The polypropylene resin (a) may be combined with the polypropylene resin (A) as desired according to the purpose.

Some examples of the conjugated diene compound (b) include butadiene, isoprene, 1,3-heptadiene, 2,3-dimethylbutadiene, and 2,5-dimethyl-2,4-hexadiene. These compounds may be used alone, or two or more of these may be used in combination. Among these, butadiene or isoprene may be used because of their low cost, and isoprene may be used because it is easy to handle and it allows for a uniform reaction.

The amount of the conjugated diene compound (b) used may be at least 0.01 parts by weight but not more than 20 parts by weight, such as at least 0.05 parts by weight but not more than 5 parts by weight per 100 parts by weight of the polypropylene resin (a). If the amount of the conjugated diene compound added is less than 0.01 parts by weight, the modification effect may be less likely to be obtained. Also, with an amount more than 20 parts by weight, the effect may already be saturated, which is uneconomical.

Here, one or two or more monomers copolymerizable with the conjugated diene compound (b) may be used in combination as long as they do not significantly inhibit the effects disclosed. Examples include vinyl chloride, vinylidene chloride, acrylonitrile, methacrylonitrile, acrylamide, methacrylamide, vinyl acetate, styrene, divinylbenzene, acrylic acid, methacrylic acid, maleic acid, maleic anhydride, glycidyl methacrylate, acrylic acid metal salts, methacrylic acid metal salts, acrylic acid esters such as methyl acrylate, ethyl acrylate, butyl acrylate, 2-ethylhexyl acrylate, and stearyl acrylate, and methacrylic acid esters such as methyl methacrylate, ethyl methacrylate, butyl methacrylate, 2-ethylhexyl methacrylate, and stearyl methacrylate.

Examples of the radical polymerization initiator (c) typically include peroxides and azo compounds having the ability to abstract hydrogen from the polypropylene resin or the conjugated diene compound. Examples typically include organic peroxides such as ketone peroxides, peroxyketals, hydroperoxides, dialkylperoxides, diacylperoxides, peroxydicarbonates, and peroxyesters. Among these, are those having particularly high hydrogen abstraction abilities, examples of which include peroxyketals such as 1,1-bis(t-butylperoxy)-3,3,5-trimethylcyclohexane, 1,1-bis(t-butylperoxy)cyclohexane, n-butyl-4,4-bis(t-butylperoxy)valerate, and 2,2-bis(t-butylperoxy)butane; dialkylperoxides such as dicumyl peroxide, 2,5-dimethyl-2,5-di(t-butylperoxy)hexane, α,α'-bis(t-butylperoxy-m-isopropyl)benzene, t-butyl cumyl peroxide, di-t-butyl peroxide, and 2,5-dimethyl-2,5-di(t-butylperoxy)-3-hexyne; diacylperoxides such as benzoyl peroxide; and peroxyesters such as t-butyl peroxyoctoate, t-butyl peroxyisobutyrate, t-butyl peroxylaurate, t-butyl peroxy-3,5,5-trimethylhexanoate, t-butyl peroxyisopropylcarbonate, 2,5-dimethyl-2,5-di(benzoylperoxy)hexane, t-butyl peroxyacetate, t-butyl peroxybenzoate, and di-t-butyl peroxyisophthalate. These compounds may be used alone, or two or more of these may be used in combination.

The amount of the radical polymerization initiator (c) added may be at least 0.01 parts by weight but not more than 10 parts by weight, such as at least 0.05 parts by weight but not more than 4 parts by weight per 100 parts by weight of the polypropylene resin (a). If the amount of the radical polymerization initiator added is less than 0.01 parts by weight, the modification effect may be less likely to be obtained. Also, with an amount more than 10 parts by weight, the decomposition reaction of the polypropylene resin (a) may proceed excessively.

It is difficult to indicate the amounts of the conjugated diene compound (b) and the radical polymerization initiator (c) and the ratio of these amounts because they greatly vary depending on the type of conjugated diene compound or radical polymerization initiator used or the kneading conditions. However, the amounts and the ratio need to be controlled so that the decomposition reaction of the polypropylene resin (a) is reduced to a necessary and sufficient extent and that a branch structure is formed to a desired extent.

Generally, a polypropylene resin undergoes a decomposition reaction when it is combined with a radical polymerization initiator and melt-kneaded. The degree of reaction increases with increasing the amount of the radical polymerization initiator. By using the conjugated diene compound in combination, the decomposition reaction can be reduced and a branch structure can be formed. If a fixed amount of the radical polymerization initiator is used, it is presumed that as the amount of the conjugated diene compound increases, the amount of the branch structure increases until the effect is saturated. Thus, the strain hardening in elongational viscosity of the resulting modified polypropylene resin tends to increase. For this reason, if satisfactory elongational viscosity characteristics are not obtained by increasing the amount of the conjugated diene compound, the amount of the radical polymerization initiator needs to be increased. Thus, the modified polypropylene resin (B) may be prepared with relatively easy controls.

Polypropylene resins having a branch structure are known to exhibit "strain hardening" in elongational viscosity measurement. The degree of strain hardening can be controlled by controlling the formulation in or the conditions of melt kneading. Generally, elongational viscosity increases with increase in strain. Resins are considered as "having strain hardening" if they show an elongational viscosity curve having an inflection point at a strain of at least 0.1 but less than 3, in which after the inflection point, the elongational viscosity rapidly increases (i.e. the rate of increase in elongational viscosity increases) with increase in strain, while resins that do not show such characteristics are considered as "having no strain hardening".

This will be described with reference to The Figure.

The elongational viscosity refers to so-called "uniaxial elongational viscosity" which is defined as a function of time by formula 2. The stress $\sigma(t)$ in formula 2 is a function of time, which is determined from a load required to subject a molten sample to uniaxial elongation at a constant extension rate $\gamma s$ defined by formula 1 (0.1/sec at 180° C). Moreover, the strain $\gamma(t)$ at time t is defined by formula 3.

$$\gamma s = d/dt[\{L(t)-L(0)\}/L(0)] \quad \text{(formula 1)}$$

where $\gamma s$: extension rate, t: time, L(t): sample length at time t, L(0): sample length at a time of 0.

$$\eta e(t) = \sigma(t)/\gamma s \quad \text{(formula 2)}$$

where $\eta e(t)$: elongational viscosity at time t, $\sigma(t)$: extensional stress at time t.

$$\gamma(t) = \gamma s \times t \quad \text{(formula 3)}$$

Strain and elongational viscosity are measured using apparatuses and conditions corresponding to the above method. The measurement can be carried out as described in Examples.

The FIGURE shows the results of the elongational viscosity measurement of the resin (A-1) used as a polypropylene resin (A) and the resins (B-1) and (B-4) used as modified polypropylene resins (B) in examples and comparative examples. It is shown that both of the resins (B-1) and (B-4) exhibit strain hardening, while the resin (A-1) does not exhibit it.

The FIGURE shows that the elongational viscosity of the resin (B-1) in the strain hardening region (a portion where the elongational viscosity rapidly increases, that is, a region with strains higher than that at the inflection point of the elongational viscosity curve) is higher than that of the resin (A-1). One of the features is that the elongational viscosity of the modified polypropylene resin (B) in the strain hardening region is higher than the elongational viscosity of the polypropylene resin (A). Particularly at a strain of 3 (corresponding to the strain hardening region), the elongational viscosity of the modified polypropylene resin (B) is at least 1.5 times the elongational viscosity of the polypropylene resin (A). Such a modified polypropylene resin (B) can be readily achieved by controlling the formulation or conditions for the preparation of the modified polypropylene resin.

The elongational viscosity of the modified polypropylene resin (B) at a strain of 3 is at least 1.5 times, such as least 3 times, or such as at least 5 times the elongational viscosity of the polypropylene resin (A). Also, the upper limit of the elongational viscosity of the modified polypropylene resin (B) may be not more than 100 times, such as not more than 40 times the elongational viscosity of the polypropylene resin (A). If it is less than 1.5 times, the drawdown-reducing effect tends to be insufficient. Also, if it is more than 100 times, a gel is more likely to be formed in the modified polypropylene resin, which may result in poor appearance.

The MFR (230° C., 2.16 kg load) of the polypropylene resin (a) may be 1 to 10 g/10 min, such as 1.5 to 9 g/10 min, or such as 3 to 8 g/10 min. If the MFR is less than 1 g/10 min, the shear viscosity of the modified polypropylene resin (B) tends to become too high. Also, if the MFR is more than 10 g/10 min, the amount of the conjugated diene compound (b) and the radical polymerization initiator (c) required to obtain the elongational viscosity characteristics is increased, resulting in increased residue content and increased production cost.

As shown in the elongational viscosity curve of the resin (B-1) used in examples, the elongational viscosity before strain hardening (i.e. in a region where the strain is smaller than those of a portion where the elongational viscosity rapidly increases, that is, a region with strains smaller than that at the inflection point of the elongational viscosity curve) (referred to as the elongational viscosity in the linear region) is lower than the elongational viscosity of the resin (A-1). Thus, the elongational viscosity of the modified polypropylene resin (B) in the linear region may be equivalent to or slightly lower than the elongational viscosity of the polypropylene resin (A). In contrast, the elongational viscosity of the resin (B-4) used in a comparative example in the linear region is higher than that of the resin (A-1), and a resin sheet obtained from a combination of the resins (B-4) and (A-1) tends to have an insufficient drawdown-reducing effect.

The MFR (230° C., 2.16 kg load) of the polypropylene resin (a) is not lower than the MFR of the polypropylene resin (A). If the MFR of the polypropylene resin (a) is lower than the MFR of the polypropylene resin (A), the elongational viscosity of the modified polypropylene resin (B) in the linear region may be higher than the elongational viscosity of the polypropylene resin (A) like the resin (B-4) used in a comparative example, and the resin sheet may have an insufficient drawdown-reducing effect.

The MFR (230° C., 2.16 kg) of the modified polypropylene resin (B) is selected depending on the polypropylene resin (A), and may be higher than the MFR of the polypropylene resin (A) measured under the same conditions because a uniform mixture is more likely to be obtained and also because shaping can be achieved at relatively low forming temperature. The MFR of the modified polypropylene resin (B) may also be in the range of 0.3 to 20 g/10 min, such as 0.5 to 15 g/10 min, or such as 1.0 to 10 g/10 min. If the MFR is lower than 0.3 g/10 min, a uniform mixture is less likely to be obtained. Also, if the MFR is higher than 20 g/10 min, drawdown resistance tends to be impaired.

As described above, the combined use of a polypropylene resin (A) and a modified polypropylene resin (B) enables the polypropylene resin sheet to show sufficiently reduced drawdown and at the same time have excellent melt elongation.

Next, the method for producing the modified polypropylene resin (B) is described below.

For the production of the modified polypropylene resin (B), any apparatus may be used to melt knead the polypropylene resin (a), the conjugated diene compound (b), and the radical polymerization initiator (c). Examples of usable apparatuses include kneading apparatuses such as rolls, co-kneaders, Banbury mixers, Brabenders, single screw extruders, and twin screw extruders; horizontal agitators such as twin-screw surface renewal devices and twin-screw multi-disk devices; and vertical agitators such as double helical ribbon agitators. Among these, kneading apparatuses such as extruders may be used.

In the melt kneading of the polypropylene resin (a), the conjugated diene compound (b), and the radical polymerization initiator (c), they may be added in any order by any method. The polypropylene resin (a), the conjugated diene compound (b), and the radical polymerization initiator (c) may be melt-kneaded together after they are mixed, or after part of these materials is mixed and then melt-kneaded, the rest may be added thereto and then melt-kneaded. Alternatively, the conjugated diene compound (b) and the radical polymerization initiator (c) may be added to the molten polypropylene resin (a) simultaneously or separately, either at one time or in portions, followed by melt kneading. However, mixing the molten polypropylene resin (a) to which only the radical polymerization initiator is added for a long time should be avoided because the decomposition reaction as described above may excessively proceed.

The temperature during the melt kneading may be selected so that the polypropylene resin (a) used is sufficiently molten but is not thermally decomposed. The reaction time is reduced by increasing the temperature, but at too high a temperature, the reaction may not uniformly proceed. The temperature is typically at least 130° C. but not higher than 300° C., such as at least 160° C. but not higher than 250° C. The period of melt kneading may also be selected to be sufficient to complete the reaction, and is typically 1 to 60 min. In addition, the reaction residues such as the remaining unreacted conjugated diene compound (b) and radical polymerization initiator (c) may be removed from the resin by, for example, venting during the melt kneading.

The modified polypropylene resin (B) prepared as above may have any shape or size, and is typically granulated into pellets, flakes, or other shapes in view of handleability in the subsequent step. Further, in order to, for example, remove the reaction residues such as the remaining unreacted conjugated diene compound and radical polymerization initiator, the obtained modified polypropylene resin (B) may be subjected to heat treatment at a temperature at which it does not melt, or may be melt-kneaded again.

The polypropylene resin composition may be prepared by any method, such as for example by adding the polypropylene resin (A) to the molten modified polypropylene resin (B) obtained in the production of the modified polypropylene resin (B), followed by melt kneading the mixture. The polypropylene resin composition is usually obtained in a granular form.

In the preparation, for example, resins other than the resins (A) and (B), rubbers, and additives may be incorporated into the polypropylene resin composition as long as they do not significantly inhibit the desired effects. Examples of these resins or rubbers include polyethylene; poly-α-olefins such as polybutene-1, polyisobutene, polypentene-1, and polymethylpentene-1; ethylene or α-olefin/α-olefin copolymers such as ethylene/propylene copolymers with a propylene content of less than 75% by weight, ethylene/butene-1 copolymers, ethylene/hexene-1 copolymers, ethylene-octene-1 copolymers, propylene/butene-1 copolymers with a propylene content of less than 75% by weight, propylene/hexene-1 copolymers, and propylene/octene-1 copolymers; ethylene or α-olefin/α-olefin/diene monomer copolymers such as ethylene/propylene/5-ethylidene-2-norbornene copolymers with a propylene content of less than 75% by weight; ethylene/vinyl monomer copolymers such as ethylene/vinyl acetate copolymers, ethylene/acrylic acid copolymers, ethylene/methacrylic acid copolymers, ethylene/ethyl acrylate copolymers, ethylene/butyl acrylate copolymers, ethylene/methyl methacrylate copolymers, ethylene/maleic anhydride copolymers, ethylene/acrylic acid metal salt copolymers, ethylene/methacrylic acid metal salt copolymers, and ethylene/glycidyl methacrylate copolymers; polydiene copolymers such as polybutadiene and polyisoprene; vinyl monomer/diene monomer/vinyl monomer block copolymers or hydrogenated products thereof such as styrene/butadiene/styrene block copolymers and styrene/isoprene/styrene block copolymers; styrene/isobutylene/styrene block copolymers; vinyl monomer/diene monomer/vinyl monomer graft copolymers such as acrylonitrile/butadiene/styrene graft copolymers and methyl methacrylate/butadiene/styrene graft copolymers; vinyl polymers such as polyvinyl chloride, polyvinylidene chloride, polyacrylonitrile, polyvinyl acetate, polyethyl acrylate, polybutyl acrylate, polymethyl methacrylate, and polystyrene; and vinyl copolymers such as vinyl chloride/acrylonitrile copolymers, vinyl chloride/vinyl acetate copolymers, acrylonitrile/styrene copolymers, and methyl methacrylate/styrene copolymers.

The amount of these resins or rubbers in the polypropylene resin composition varies depending on the type of resin or rubber, and is usually not more than 25% by weight of the total weight of the polypropylene resin composition.

The additives may be those generally used in polypropylene resin sheets, and examples include stabilizers used to reduce degradation of polypropylene resins during their processing or long term exposure to the environment, such as hindered phenol stabilizers, phosphorus stabilizers, hindered amine stabilizers, thioester stabilizers, and benzotriazole stabilizers; flame retardants used to enhance flame retardancy, such as halogen compounds, aluminum hydroxide, magnesium hydroxide, phosphates, and antimony compounds; inorganic fillers used to enhance stiffness, such as talc, glass fibers, carbon fibers, carbon black, calcium carbonate, clay, mica, kaolin, and titanium oxide; nucleating agents used to enhance transparency or stiffness, such as sorbitol nucleating agents, benzoates, and organic phosphates; lubricants such as stearic acid amide, N-stearyl-stearic acid amide, and N,N'-ethylene bisstearic acid amide; antiblocking agents; antistatic agents; fluorescent brightening agents; antimicrobial agents; pigments; and dyes.

The amount of these additives in the polypropylene resin composition greatly varies depending on the purpose or the type of additive, and is usually not more than 50% by weight of the total weight of the polypropylene resin composition. These additives are added directly or as a masterbatch. The resins, rubbers, additives, and the like described above may be added in the preparation of the polypropylene resin composition, or may also be incorporated into the polypropylene resin (A) or the modified polypropylene resin (B) in advance.

<Polypropylene Resin Sheet>

The polypropylene resin sheet may be produced using the polypropylene resin (A) and modified polypropylene resin (B) described above as base materials. That is, the polypropylene resin sheet is obtained by forming the polypropylene resin composition containing the polypropylene resin (A) and the modified polypropylene resin (B) into a sheet.

The forming method and apparatus for producing the polypropylene resin sheet are not particularly limited. Examples of usable forming methods include roll forming, calendering, press forming, transfer forming, inflation molding, injection molding, and extrusion. These methods can all be suitably used. Among these, calendering or extrusion using an extruder provided with a T-die or a cyclic die at the tip thereof may be used in terms of productivity.

In addition, the processing conditions are not particularly limited. The polypropylene resin sheet can be produced without a problem at a processing temperature of about 170 to 250° C. at which polypropylene resins are usually processed.

Furthermore, the techniques generally used to form polypropylene resin sheets include those in which the resulting sheet is passed through mirror-finish rolls to enhance the smoothness of the surface of the sheet, or through embossing rolls to emboss the surface, or through chill rolls to enhance the transparency.

The polypropylene resin sheet may be produced as described above. The polypropylene resin sheet further has excellent appearance without impairing its high heat resistance, high chemical resistance, and high stiffness when it is formed only from polypropylene resins, although the composition can be controlled depending on the purpose. Moreover, the polypropylene resin sheet usually has a thickness in the range of 0.1 to 10 mm. In particular, the polypropylene resin sheet may exhibit excellent thermoformability even when it is a thick sheet of at least 1.0 mm because drawdown of the sheet is effectively reduced. Also, the width of the sheet varies depending on the processing method, and can be up to about 2000 mm, as necessary.

<Formed Article>

The polypropylene resin sheet may directly be cut into a required size before use, or may be suitably used to produce various formed articles by thermoforming. The formed article may be obtained by thermoforming the polypropylene resin sheet.

Examples of the method for thermoforming include vacuum forming, pressure forming, press forming, and twin composite forming. In addition, for example, a method in which a sheet is pre-stretched, for example, by pressure and then closely adhered to a mold before shaping can be applied without a problem. Since drawdown during preheating of the polypropylene resin sheet is effectively reduced, and the melt elongation of the sheet is also excellent, any method for thermoforming including the above-described methods can be suitably used. The sheet with such characteristics exhibits the following advantageous effects: the sheet is formable even when the sheet is disadvantageous from a drawdown standpoint in that it has a large thickness or a high basis weight (weight per unit area) resulting from incorporation of a large amount of additives; a deep-drawn formed article can be readily obtained; a formed article uniform in thickness is obtained; the forming cycle can be reduced; and the like.

Moreover, in the thermoforming of the polypropylene resin sheet, the temperature of the resin sheet before shaping (hereinafter, referred to as forming temperature) may be set appropriately within a range suitable for the base materials used to form the resin sheet.

Generally, the lower the MFR of the base materials, the higher the forming temperature needs to be. In this case, drawdown tends to be increased. However, particularly when the MFR of the modified polypropylene resin (B) used is higher than that of the polypropylene resin (A), the following further advantageous effect is produced: shaping can be achieved at relatively low forming temperature.

The formed article produced as above is very useful as it can be suitably used in a wide range of applications, such as food containers, automotive parts, building materials, and home appliance parts.

EXAMPLES

One or more embodiments of the present invention will be described in more detail below by way of examples, but should not be limited at all to these examples. The below described test methods and determination criteria were used in evaluations of examples and comparative examples.

<Melt Flow Rate (MFR)>

A resin was extruded over a predetermined time from a die at 230° C. under a load of 2.16 kg using a Melt Indexer S-01 (manufactured by Toyo Seiki Seisaku-sho, Ltd.) according to Method A set forth in JIS K 7210 (1999), and the amount of the resin extruded in 10 minutes was then calculated and taken as the MFR.

Here, the predetermined time was 120 seconds for a melt flow rate of more than 0.5 g/10 min but not more than 1.0 g/10 min; 60 seconds for a melt flow rate of more than 1.0 g/10 min but not more than 3.5 g/10 min; 30 seconds for a melt flow rate of more than 3.5 g/10 min but not more than 10 g/10 min; 10 seconds for a melt flow rate of more than 10 g/10 min but not more than 25 g/10 min. The extrudate was cut off at the predetermined time intervals, and the average of three cuts of the extrudate obtained was calculated. When three cuts could not be obtained in one measurement, the measurement was continued until three cuts were obtained. If the melt flow rate as measured for a certain number of seconds was not in the corresponding range, the measurement was again performed with a number of seconds corresponding to this melt flow rate.

<Elongational Viscosity>

Elongational viscosity was measured as follows: Evaluation was performed using an ARES rheometer (manufactured by TA Instruments) to which an elongational viscosity fixture (available from the same company) was attached. The resin pellets to be measured were pressed at 240° C. to form a formed product with a dimension of 10×18×1.0 mm as a sample. The measurement was started after the sample was set in the fixture and preheated at 180° C. for 5 minutes. The parameters of the measurement conditions were as follows:

Extension rate: 0.1/sec;
Time: 30 sec;
Solid density: 0.9;
Melt density: 0.8;
Pre-stretch rate: 0.005 (1/sec); and
Relaxation after pre-stretch: 0 sec.

After the measurement, as illustrated in The Figure, a double logarithmic graph was plotted, where the horizontal axis represents the strain and the vertical axis represents the elongational viscosity. The strain and elongational viscosity values used were given by the program provided with the apparatus.

Also, the determined elongational viscosities of samples at a strain of 3 were used to calculate the elongational viscosity ratio of the modified polypropylene resin (B) to the polypropylene resin (A).

<Drawdown Resistance>

As described below, a resin sheet prepared in the manner described below was heated and the time until the sheet was partially sagged by 100 mm was determined as a drawdown time. A longer drawdown time indicates reduced drawdown. Also, the ratio of the drawdown time of the resin sheet to the drawdown time of a resin sheet formed only from the polypropylene resin (A) used in the former (hereinafter, referred to as drawdown time ratio) was evaluated as described below.

A 350 mm-square resin sheet was cut out and fixed between wooden frames with a 300×300 mm square opening. The resin sheet placed between the wooden frames was put in a hot air dryer (model SOFW-600 manufactured by AS ONE Corporation) set at 200° C., and horizontally placed on a rack, and at the same time the time measurement was started. In this operation, the wooden frames were set on the rack as soon as possible in order to prevent the temperature in the dryer from falling and in a similar amount of time as each sample. The vertical distance between the lowest point of the sagging resin sheet and the level of the under surface of the resin sheet when it was set between the frames was measured with a scale previously attached to the wooden frames. The time until the above distance reached 100 mm was recorded as "drawdown time". Also, drawdown resistance was evaluated based on the following criteria:

Good: drawdown time ratio is at least 110%;
Fair: drawdown time ratio is at least 105% but less than 110%; and
Bad: drawdown time ratio is less than 105%.

<Melt Elongation>

A pelletized sample cut out from a resin sheet prepared in the manner described below was evaluated for melt elongation by determining whether the molten strand broke or not when it was taken up at high speed. In the evaluation, a capillary rheometer (Capilograph manufactured by Toyo Seiki Seisaku-sho, Ltd.) with a φ 10 mm cylinder, provided with an attachment for measuring melt tension was used. The capillary rheometer was equipped with a φ 1 mm orifice of 10 mm in length on its tip. First, the cylinder set at 230° C. was filled with the pelletized sample and preheated for 5 minutes. Then, the molten sample was extruded into a strand by a piston falling at a piston speed of 10 mm/min, and at the same time the strand extruded from the die was hung on a pulley provided with a load cell, located 350 mm below the exit, and then taken up stably at a take-up speed of 2 m/min. Next, the take-up speed was increased to 40 m/min and then 100 m/min, and whether the strand was able or unable to be taken up at these speeds was observed and evaluated as "melt elongation" based on the following criteria:

Good: the strand can be stably taken up at a take-up speed of 100 m/min;
Fair: the strand can be stably taken up at a take-up speed of 40 m/min, but breaks at a take-up speed of 100 m/min; and
Bad: the strand breaks at a take-up speed of 40 m/min.

The resins used in examples and comparative examples are explained below.

(A) Polypropylene Resin (A-1): Propylene homopolymer F113G manufactured by Prime Polymer Co., Ltd., MFR=3.0 g/10 min (230° C., 2.16 kg)

(A-2): Propylene homopolymer E111G manufactured by Prime Polymer Co., Ltd., MFR=0.5 g/10 min (230° C., 2.16 kg)

(A-3): Propylene homopolymer Y-400GP manufactured by Prime Polymer Co., Ltd., MFR=4.0 g/10 min (230° C., 2.16 kg)

(A-4): Propylene-ethylene random copolymer J232WA manufactured by Prime Polymer Co., Ltd., MFR=1.5 g/10 min (230° C., 2.16 kg)

(B) Modified Polypropylene Resin (B-1): A modified polypropylene resin prepared in the following manner: a mixture of 100 parts by weight of a propylene homopolymer having a MFR of 8.0 g/10 min (230° C., 2.16 kg) as a linear polypropylene resin and 0.7 parts by weight of t-butyl peroxyisopropylcarbonate as a radical polymerization initiator was fed from a hopper to a φ 45 mm twin screw extruder (L/D=40) at 70 kg/h, and melt-kneaded at a cylinder temperature of 200° C. and a rotational speed of 150 rpm; isoprene monomer as a conjugated diene compound was fed in an amount of 0.4 parts by weight per 100 parts by weight of the propylene homopolymer (0.28 kg/h) through a pressure injection port provided in the middle using a metering pump, and melt-kneaded with the mixture in the twin screw extruder; and a strand was extruded, cooled with water, and finely cut. MFR=6.7 g/10 min (230° C., 2.16 kg)

(B-2): A modified polypropylene resin prepared in the same manner as for the resin B-1, except that 100 parts by weight of a propylene homopolymer having a MFR of 3.0 g/10 min (230° C., 2.16 kg) as a linear polypropylene resin, 0.6 parts by weight of t-butyl peroxyisopropylcarbonate as a radical polymerization initiator, and 0.5 parts by weight (0.35 kg/h) of isoprene monomer were used. MFR=1.1 g/10 min (230° C., 2.16 kg)

(B-3): A modified polypropylene resin prepared in the same manner as for the resin B-1, except that 0.7 parts by weight of t-butyl peroxyisopropylcarbonate as a radical polymerization initiator and 0.5 parts by weight (0.35 kg/h) of isoprene monomer were used. MFR=2.9 g/10 min (230° C., 2.16 kg)

(B-4): A modified polypropylene resin prepared in the same manner as for the resin B-1, except that 100 parts by weight of a propylene homopolymer having a MFR of 2.0 g/10 min (230° C., 2.16 kg) as a linear polypropylene resin, 0.6 parts by weight of t-butyl peroxyisopropylcarbonate as a radical polymerization initiator, and 0.5 parts by weight (0.35 kg/h) of isoprene monomer were used. MFR=0.8 g/10 min (230° C., 2.16 kg)

(B-5): A modified polypropylene resin prepared in the same manner as for the resin B-1, except that 0.1 parts by weight of t-butyl peroxyisopropylcarbonate as a radical polymerization initiator and 0.3 parts by weight (0.21 kg/h) of isoprene monomer were used. MFR=8.0 g/10 min (230° C., 2.16 kg)

(B-6): A modified polypropylene resin prepared in the same manner as for the resin B-1, except that 100 parts by weight of a propylene-ethylene random copolymer having a MFR of 7.0 g/10 min (230° C., 2.16 kg) as a linear polypropylene resin, 0.6 parts by weight of t-butyl peroxyisopropylcarbonate as a radical polymerization initiator, and 0.3 parts by weight (0.21 kg/h) of isoprene monomer were used. MFR=3.5 g/10 min (230° C., 2.16 kg)

The formulations and MFRs of the modified polypropylene resins (B) are collectively shown in Table 1.

Also, the elongational viscosities of the resins (A-1), (B-1), and (B-4) are shown in The Figure. The resins (B-2), (B-3), (B-5), and (B-6) were also measured for elongational viscosity, and as a result it was found that all the resins (B-1) to (B-6) exhibited strain hardening.

TABLE 1

| | | | | Production Example 1 | Production Example 2 | Production Example 3 | Production Example 4 | Production Example 5 | Production Example 6 |
|---|---|---|---|---|---|---|---|---|---|
| Formulation | Modified polypropylene resin (B) | | | B-1 | B-2 | B-3 | B-4 | B-5 | B-6 |
| | Polypropylene resin (a) | | parts by weight | 100 | 100 | 100 | 100 | 100 | 100 |
| | Conjugated diene compound (b) | Isoprene | parts by weight | 0.4 | 0.5 | 0.5 | 0.5 | 0.3 | 0.3 |
| | Radical polymerization initiator (c) | TBIC* | parts by weight | 0.7 | 0.6 | 0.7 | 0.6 | 0.1 | 0.6 |
| MFR | Polypropylene resin (a) | (230° C., 2.16 kg) | g/10 min | 8.0 | 3.0 | 8.0 | 2.0 | 8.0 | 7.0 |
| | Modified polypropylene resin (B) | (230° C., 2.16 kg) | g/10 min | 6.7 | 1.1 | 2.9 | 0.8 | 8.0 | 3.5 |

*t-butyl peroxyisopropylcarbonate

Example 1

90 parts by weight of the resin (A-1) as a polypropylene resin (A) and 10 parts by weight of the resin (B-1) as a modified polypropylene resin (B) were pellet-blended to give a mixture. The mixture was melt-kneaded in a (p 40 mm single screw extruder set at 230° C., and then extruded through a T-die attached to the tip, and the extrudate was taken up with cooling using chill rolls to obtain a 1.0 mm-thick resin sheet. Table 2 shows the evaluation results of the resin sheet with the elongational viscosity ratio at a strain of 3.

Examples 2 to 4 and Comparative Examples 1 to 3

Resin sheets were prepared as in Example 1, except that the amounts of the resins (A) and (B) used in Example 1 were changed to the amounts shown in Table 2. Table 2 shows the evaluation results. The drawdown time ratio in Comparative Example 3 is a ratio relative to the drawdown time of the resin sheet formed from the resin (A-1) alone (Comparative Example 1).

TABLE 2

| | | | | Example 1 | Example 2 | Example 3 | Example 4 | Comparative Example 1 | Comparative Example 2 | Comparative Example 3 |
|---|---|---|---|---|---|---|---|---|---|---|
| Formulation | Polypropylene resin (A) | A-1 | parts by weight | 90 | 80 | 95 | 60 | 100 | 40 | — |
| | | A-2 | parts by weight | | | | | | | |
| | | A-3 | parts by weight | | | | | | | |
| | Modified polypropylene | B-1 | parts by weight | 10 | 20 | 5 | 40 | | 60 | 100 |

TABLE 2-continued

|  |  |  |  | Example 1 | Example 2 | Example 3 | Example 4 | Comparative Example 1 | Comparative Example 2 | Comparative Example 3 |
|---|---|---|---|---|---|---|---|---|---|---|
|  | resin (B) | B-2 | parts by weight |  |  |  |  |  |  |  |
|  |  | B-3 | parts by weight |  |  |  |  |  |  |  |
|  |  | B-4 | parts by weight |  |  |  |  |  |  |  |
|  |  | B-5 | parts by weight |  |  |  |  |  |  |  |
| Resin evaluation | Elongational viscosity ratio (B)/(A) | 180° C., strain 3 |  | 11.2 | 11.2 | 11.2 | 11.2 | — | 11.2 | — |
| Sheet evaluation | Drawdown time | 200° C. | min | 6.4 | 7.1 | 6.0 | 8.2 | 5.5 | 10.3 | 15.4 |
|  | Drawdown time ratio | 200° C. | % | 116 | 129 | 109 | 149 | 100 | 187 | 280 |
|  | Drawdown resistance | 200° C. |  | Good | Good | Fair | Good | Bad | Good | Good |
|  | Melt elongation | 230° C. |  | Good | Good | Good | Fair | Good | Bad | Bad |

Table 2 shows that the resin sheets of examples obtained by incorporation of the resin (B-1) produced from a polypropylene resin (a) having a MFR higher than the MFR (3.0) of the resin (A-1), whose elongational viscosity was at least 1.5 times that of the resin (A-1) exhibited improved and good drawdown resistance compared to the resin sheet formed from the resin (A-1) alone (Comparative Example 1). Table 2 further shows that the resin sheets with a resin (B-1) content in the range of 3% to 40% by weight were also excellent in melt elongation.

Example 5

A resin sheet was prepared as in Example 1, except that 90 parts by weight of the resin (A-2) as a polypropylene resin (A) and 10 parts by weight of the resin (B-2) as a modified polypropylene resin (B) were used. Table 3 shows the evaluation results of the resin sheet with the elongational viscosity ratio at a strain of 3.

Examples 6 to 8 and Comparative Examples 4 to 8

Resin sheets were prepared as in Example 5, except that the types and amounts of the resins (A) and (B) were changed as shown in Table 3. Table 3 shows the evaluation results of the resin sheets with the elongational viscosity ratios at a strain of 3.

Note that a resin sheet containing 100% by weight of the resin (A-4) and a resin sheet containing 100% by weight of the resin (A-3) were separately prepared as reference samples to calculate the drawdown time ratio in Example 8 and Comparative Example 6.

TABLE 3

|  |  |  |  | Example 5 | Example 6 | Example 7 | Example 8 | Comparative Example 4 | Comparative Example 5 | Comparative Example 6 | Comparative Example 7 | Comparative Example 8 |
|---|---|---|---|---|---|---|---|---|---|---|---|---|
| Formulation | Polypropylene resin (A) | A-1 | parts by weight |  |  |  |  |  |  |  | 90 | 90 |
|  |  | A-2 | parts by weight | 90 | 80 | 90 |  | 100 | 40 |  |  |  |
|  |  | A-3 | parts by weight |  |  |  |  |  |  | 90 |  |  |
|  |  | A-4 | parts by weight |  |  |  | 90 |  |  |  |  |  |
|  | Modified polypropylene resin (B) | B-1 | parts by weight |  |  |  |  |  |  |  |  |  |
|  |  | B-2 | parts by weight | 10 | 20 |  |  |  | 60 | 10 |  |  |
|  |  | B-3 | parts by weight |  |  | 10 |  |  |  |  |  |  |
|  |  | B-4 | parts by weight |  |  |  |  |  |  |  | 10 |  |
|  |  | B-5 | parts by weight |  |  |  |  |  |  |  |  | 10 |
|  |  | B-6 | parts by weight |  |  |  | 10 |  |  |  |  |  |
| Resin evaluation | Elongational viscosity ratio (B)/(A) | 180° C., strain 3 |  | 7.2 | 7.2 | 2.2 | 10.6 | — | 7.2 | 79.8 | 62.0 | 1.2 |
| Sheet evaluation | Drawdown time | 200° C. | min | 15.2 | 16.8 | 13.8 | 6.3 | 11.0 | 21.2 | 5.7 | 5.6 | 4.5 |
|  | Drawdown time ratio | 200° C. | % | 138 | 152 | 125 | 124 | 100 | 193 | 102 | 102 | 82 |
|  | Drawdown resistance | 200° C. |  | Good | Good | Good | Good | Bad | Good | Bad | Bad | Bad |

TABLE 3-continued

|  |  | Example 5 | Example 6 | Example 7 | Example 8 | Comparative Example 4 | Comparative Example 5 | Comparative Example 6 | Comparative Example 7 | Comparative Example 8 |
|---|---|---|---|---|---|---|---|---|---|---|
| Melt elongation | 230° C. | Good | Good | Good | Good | Good | Bad | Fair | Good | Good |

Table 3 shows that the resin sheets obtained by incorporation of the resin (B-2) or (B-3) produced from a polypropylene resin (a) having a MFR higher than the MFR (0.5) of the resin (A-2), whose elongational viscosity was at least 1.5 times that of the resin (A-2) (Examples 5 to 7) exhibited improved and good drawdown resistance compared to the resin sheet formed from the resin (A-2) alone (Comparative Example 4). It is further shown that the resin sheets with a resin (B-2) or (B-3) content in the range of 3% to 40% by weight were also excellent in melt elongation.

Table 3 shows that the resin sheet obtained by incorporation of the resin (B-6) produced from a propylene-ethylene random copolymer having a MFR higher than the MFR of the propylene-ethylene random copolymer (A-4), whose elongational viscosity was at least 1.5 times that of the resin (A-4) (Example 8) exhibited improved and good drawdown resistance compared to the resin sheet formed from the resin (A-4) alone. It is further shown that the resin sheet with a resin (B-6) content in the range of 3% to 40% by weight was also excellent in melt elongation.

In Comparative Examples 6 and 7, the resin (B) used was produced from a polypropylene resin (a) having a MFR lower than the MFR of the polypropylene resin (A). Both showed an insufficient effect in improving drawdown resistance.

In Comparative Example 8, a modified polypropylene resin (B) was used whose elongational viscosity was less than 1.5 times that of the polypropylene resin (A). It had no effect in improving drawdown resistance, but rather showed deterioration.

These results show that the desired effects can be achieved by combining the polypropylene resin (A) and the modified polypropylene resin (B), and adjusting the amounts of these resins to a suitable range.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed:

1. A polypropylene resin sheet, formed from a polypropylene resin composition, the polypropylene resin composition comprising:
    a first polypropylene resin having a concentration in the range of 60% to 97% by weight of the polypropylene resin composition; and
    a modified polypropylene resin having a concentration in the range of 3% to 40% by weight of the polypropylene resin composition, the modified polypropylene resin obtained by melt kneading a second polypropylene resin, a conjugated diene compound, and a radical polymerization initiator, wherein
    the first polypropylene resin has a MFR of 0.1 to 8 g/10 min obtained at 230° C. with a 2.16 kg load,
    the second polypropylene resin has a MFR of 1 to 10 g/10 min obtained at 230° C. with a 2.16 kg load, which is not lower than the MFR of the first polypropylene resin,
    the second polypropylene resin being (i) the same as the first polypropylene resin, (ii) different than the first polypropylene resin, or (iii) in combination with the first polypropylene resin,
    the modified polypropylene resin exhibits strain hardening in elongational viscosity measurement obtained at 180° C. with an extension rate of 0.1/sec, and
    the elongational viscosity ratio of the modified polypropylene resin to the first polypropylene resin is at least 1.5, at a strain of 3.

2. The polypropylene resin sheet according to claim 1, wherein the modified polypropylene resin has a MFR higher than the MFR of the first polypropylene resin.

3. The polypropylene resin sheet according to claim 1, wherein the conjugated diene compound is isoprene.

4. A formed article, obtained by thermoforming the polypropylene resin sheet according to claim 1.

* * * * *